F. H. ANDERSON.
COMBINED RAKE AND FORK.
APPLICATION FILED OCT 25, 1919.
1,374,800.
Patented Apr. 12, 1921.
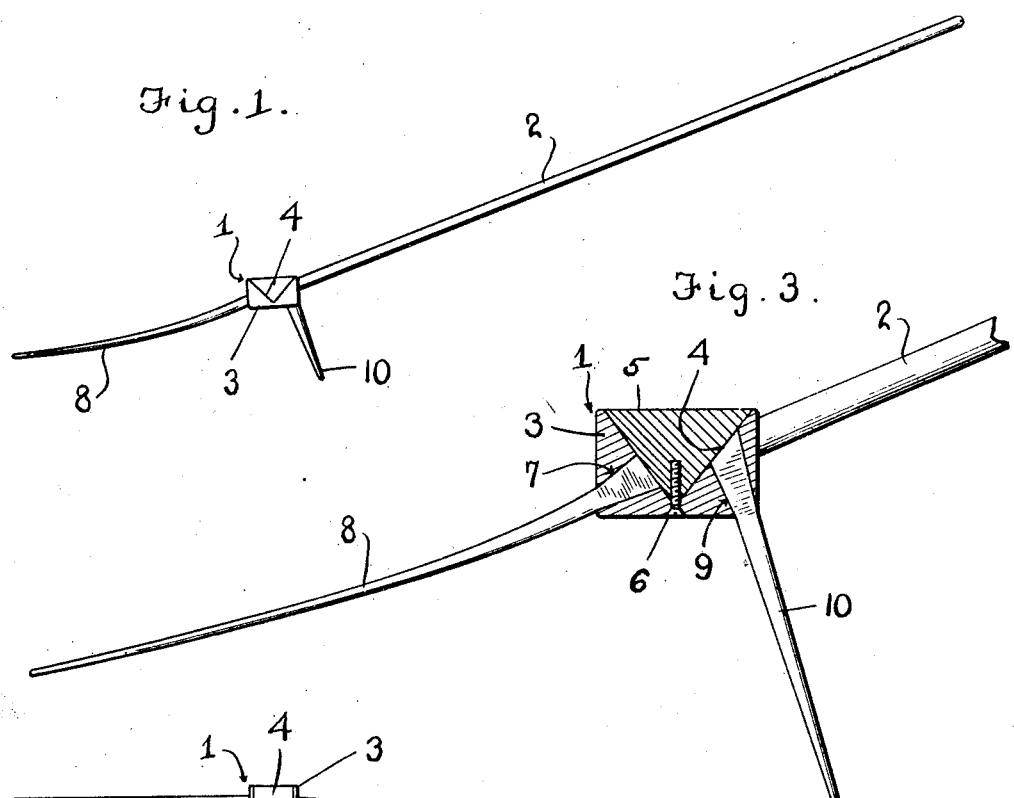
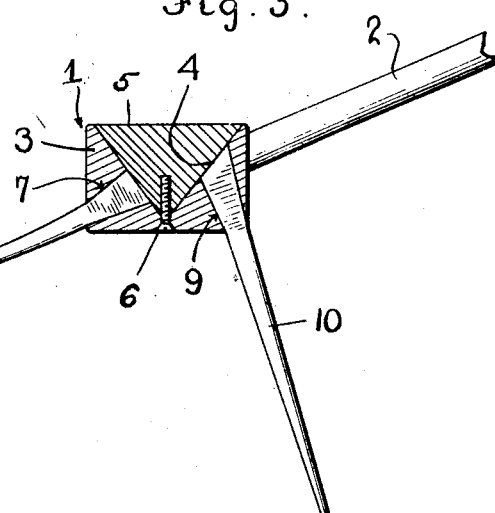
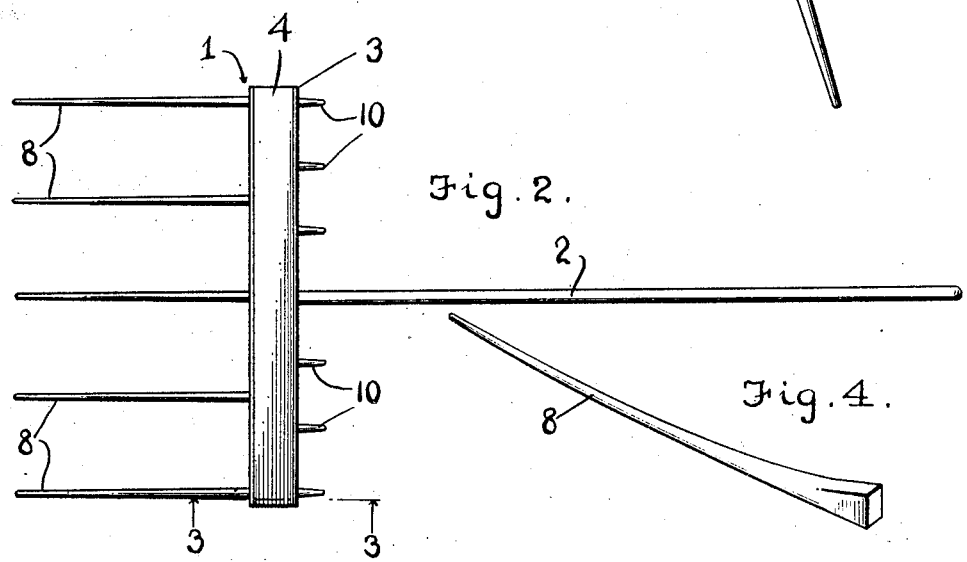
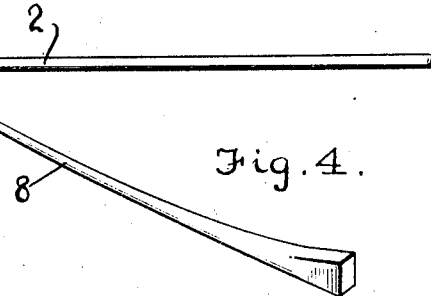
F. H. Anderson
INVENTOR.
BY
Victor J. Evans
ATTORNEY.
WITNESS:
Lo. B. James

UNITED STATES PATENT OFFICE.

FRED HOWARD ANDERSON, OF CAMDEN, NEW JERSEY.

COMBINED RAKE AND FORK.

1,374,800.  Specification of Letters Patent.  Patented Apr. 12, 1921.

Application filed October 25, 1919. Serial No. 333,203.

*To all whom it may concern:*

Be it known that I, FRED H. ANDERSON, a citizen of the United States, residing at Camden, in the county of Camden and State of New Jersey, have invented new and useful Improvements in Combined Rakes and Forks, of which the following is a specification.

This invention relates to improvements in agriculture instruments and the principal object of the invention is to provide an instrument which may be used as a rake or as a fork.

Another object of the invention is to make the teeth of the rake and the prongs of the fork detachable so that the device may be used singly as a fork or as a rake.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation of the device.

Fig. 2 is a plan view.

Fig. 3 is a section on line 3—3 of Fig. 2.

Fig. 4 is a detail view.

In these views 1 indicates the head of the instrument and 2 indicates the handle thereof which is detachably connected with the head as by having screw threaded connection therewith. The head 1 is composed of the main part 3 which is provided with a V-shaped recess 4 in its upper face and this recess is occupied by a wedge member 5, said wedge member being held in position by screws 6 or the like. Sockets 7 are formed in the outer edge of the main part and said sockets are of tapered formation with their enlarged ends opening out into the V-shaped recess. These sockets are engaged by the prongs 8 which have their ends of tapered shape to fit said sockets. These prongs are of curved formation to facilitate the handling of hay and the like by the fork. Sockets 9 pass at an angle through the main part 3 and these sockets are also of tapered formation with their large ends opening out into the recess and their small ends located at the inner corner of the lower face of the head. These sockets receive the rake teeth 10 which have their heads made to fit the sockets. The prongs and teeth are placed in engagement with the sockets through the recess after the wedge member has been removed. The tapered shape of the sockets and the heads of the prongs and teeth prevent the said prongs and teeth from passing entirely through the sockets and they are held in position in the head by the wedge shaped member being secured in the recess. It will be understood that either the prongs or the teeth may be used alone so as to make the instrument a fork or a rake, though it may be desirable to use both the prongs and the teeth at certain times where the hay is to be raked and placed in piles.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a head having a V-shaped recess in its upper face and sockets of tapered shape passing through the head and opening into one side of the recess, teeth having enlarged ends fitting in said socket and a V-shaped cover member fitting in said recess for holding the teeth in position and a handle connected with the head.

2. An agricultural implement comprising a handle, a head connected therewith and having a V-shaped recess in its upper face and two rows of tapered sockets passing through the head with the enlarged ends of each row opening into said recess at one side thereof, teeth having enlarged heads fitting in said sockets and a V-shaped cover piece fitting in the recess for holding the teeth in position.

In testimony whereof I affix my signature.

FRED HOWARD ANDERSON.